US006769716B2

(12) United States Patent
Rouhana et al.

(10) Patent No.: US 6,769,716 B2
(45) Date of Patent: Aug. 3, 2004

(54) SEAT BELT RESTRAINT SYSTEM WITH MOVABLE LAP BELT GUIDES

(75) Inventors: Stephen William Rouhana, Plymouth, MI (US); Paul George Bedewi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 09/683,474

(22) Filed: Jan. 4, 2002

(65) Prior Publication Data

US 2002/0089164 A1 Jul. 11, 2002

Related U.S. Application Data

(60) Provisional application No. 60/260,013, filed on Jan. 5, 2001.

(51) Int. Cl.[7] ................................................ B60R 22/46
(52) U.S. Cl. ..................... 280/806; 280/801.1; 297/480
(58) Field of Search ............................. 280/801.1, 802, 280/804, 806; 180/274, 282; 297/468, 469, 473, 481, 480

(56) References Cited

U.S. PATENT DOCUMENTS

| 4,221,403 A | 9/1980 | Grosser |
| 4,451,087 A | 5/1984 | Tamamushi |
| 4,790,597 A | 12/1988 | Bauer et al. |
| 4,938,319 A | 7/1990 | Ernst |
| 5,236,220 A | 8/1993 | Mills |
| 5,294,150 A | * 3/1994 | Steffens, Jr. ............. 280/801.2 |
| 6,279,954 B1 | * 8/2001 | Townsend et al. .......... 280/808 |
| 6,485,058 B1 | * 11/2002 | Kohlndorfer et al. ....... 280/808 |

FOREIGN PATENT DOCUMENTS

| DE | 2403356 | * 8/1974 | ................. 180/282 |
| JP | 56-21930 | * 2/1981 | .............. 280/801.1 |

* cited by examiner

Primary Examiner—Eric Culbreth
(74) Attorney, Agent, or Firm—Gary Smith

(57) ABSTRACT

A four-point seat belt restraint system having a lap belt movable between a comfort position wherein the portions of the belt extending over the outsides of the occupant's thighs are generally vertical, and a crash restraint position wherein the same portions extend at an angle downward and to the rear. Belt guides disposed adjacent opposite sides of the seat engage the lap belt as it extends from the anchor points toward the seat cushion. During normal vehicle operations, the belt guide is located in a comfort position that causes the portion of the lap belt passing over and around the outsides of the occupant's thighs to have a relatively vertical orientation. In the event of an actual or impending crash or other rapid vehicle deceleration, a restraints control module commands an actuation mechanism to move the belt guides rearward with respect to the comfort position, allowing the lap belt to extend in a substantially straight line to the rear-located anchor point. The lap belt thus extends downward and rearward at an angle in order to provide better restraint against forward movement of the occupant's pelvis.

18 Claims, 2 Drawing Sheets

SEAT BELT RESTRAINT SYSTEM WITH MOVABLE LAP BELT GUIDES

BACKGROUND OF INVENTION

This application claims priority on Provisional Application S. No. 60/260,013, "THREE POINT/FOUR POINT SAFETY BELT WITH SYMMETRIC BELT CONFIGURATION AND COMMON ANCHORAGE POINTS," filed Jan. 5, 2001.

The present invention relates generally to a seat belt restraint system and, more specifically, to a seat belt restraint system which changes configuration between a comfort configuration and a crash restraint configuration.

Automotive vehicle seats include a generally upright seat back mounted to a generally horizontal seat cushion for supporting a seated occupant. The seat back includes a top portion that often supports a headrest and a bottom portion that is often pivotally attached to the seat cushion for providing reclining adjustment of the seat back. The seat cushion extends between an inboard side (adjacent the center of the vehicle) and an outboard side (adjacent the door or side wall of the vehicle). A seat belt restraint system is commonly secured to the seat or the vehicle structure immediately adjacent the seat for restraining the seated occupant in the seat.

Currently, the most common type of seat belt restraint system is a three-point seat belt configuration. The three-point seat belt configuration is generally defined by a lap belt extending between the inboard and outboard side of the seat cushion and a shoulder belt extending diagonally from the outboard, top portion of the seat back to the inboard, bottom portion of the seat back. The lap belt and shoulder belt may be interconnected by a clasp or latch plate, and the clasp is releasably latched to a buckle on the inboard side of the seat cushion to fasten both the lap and shoulder belts around the occupant.

One type of seat belt restraint system utilizes a four-point seat belt configuration generally defined by a lap belt, usually made up of inboard and outboard lap belt segments extending from the respective inboard and outboard sides of the seat cushion toward the center of the seat cushion, and inboard and outboard shoulder belts extending downwardly from the top portion of the seat back adjacent the respective inboard and outboard side of the seat. When worn by an occupant of the seat, the four belt segments converge adjacent the center of the occupant's pelvis and are secured to one another at a center latch point by a buckle and latch plate mechanism to complete the four-point seat belt configuration. Each of the four segments is preferably provided with a lockable retractor reel, allowing the segments to extend and permit freedom of movement, but which lock in response to an actual or anticipated crash of the vehicle. Belt pretensioners may also be provided for one or more of the segments, as is well known in the restraints art.

For any seat belt restraint system to achieve good protection of the seat occupant, it must be voluntarily worn. Therefore, occupant comfort of the system during normal, pre-crash use is an important consideration. It has been found that occupant comfort is enhanced if the lap belt segments extend substantially vertically downward after passing around the outsides of the occupant's thighs, rather than extending rearward and downward at an angle. This more vertical orientation of the portions of the lap belt passing over the thighs also benefits restraint system performance by providing a downward pull on the shoulder belts, keeping them relatively taut and the center latch point positioned relatively low on the occupant's pelvis. This low positioning of the center latch point is important to reduce the likelihood that during a frontal crash or other abrupt vehicle deceleration the occupant will slide underneath the lap belt, a phenomenon known as "submarining."

During a crash event, though, it is preferable that the lap belt segments extend somewhat rearward after passing around the outside of the occupant's thighs. This rearward angle provides better restraint against forward movement of the occupant's pelvis.

U.S. Pat. No. 4,221,403 discloses a mechanism whereby a seat belt anchor point slides rearward in response to a threshold level of vehicle deceleration. The mechanism, however, would be difficult to adapt to a system including belt pretensioners and/or belt retractors of the type that utilize a reel around which the belt is wound.

SUMMARY OF INVENTION

The present invention provides a vehicle occupant restraint system wherein a lap belt for a seat is movable between a comfort position wherein the portions of the belt extending over the outsides of the occupant's thighs are generally vertical, and a crash restraint position wherein the same portions extend at an angle downward and to the rear. The lap belt is preferably augmented with shoulder belts to create a four-point restraint system.

The lap belt passes over the seat cushion and has opposite ends anchored adjacent opposite sides of a seat. The variable position of the lap belt is achieved by at least one belt guide disposed adjacent one side of the seat and positioned so that the lap belt engages the belt guide as it extends from the anchor point toward the seat cushion. During normal vehicle operations, the belt guide is located in a comfort position approximately below the desired position of the center latch point of the belt. The lap belt extends forwardly from the anchor point, engages the belt guide, then extends generally vertically upward toward the center latch point. Accordingly, the belt guides causes the portion of the lap belt passing over and around the outsides of the occupant's thighs to have a relatively vertical orientation and thereby provide greater comfort. The vertical orientation of the lap belt between the center latch point and the belt guide also serves to provide a downward pull on the shoulder belt segments of a four-point belt system, keeping the shoulder segments relatively taut and the center latch point properly positioned relatively low on the occupant's pelvis to inhibit "submarining." The lap belt is also easier for an occupant to don when in the comfort position, because the buckle/latch plate is farther forward, toward the knee, and so closer to the normal position of the hand when in a seated position. The occupant does not have to reach back toward the hip.

In the event of an actual or impending crash or other rapid vehicle deceleration, the belt guide moves rearward with respect to the comfort position, allowing the belt to extend in a substantially straight line to the rear-located anchor point. The lap belt thus extends downward and rearward at an angle to the vertical in order to provide better restraint against forward movement of the occupant's pelvis.

The invention restraint system provides greater comfort during normal vehicle operation while still providing improved safety performance during a crash.

Other features and advantages of the present invention will be readily appreciated and better understood after reading the subsequent description when considered in connection with the accompanying drawings.

DETAILED DESCRIPTION

Figure 1:
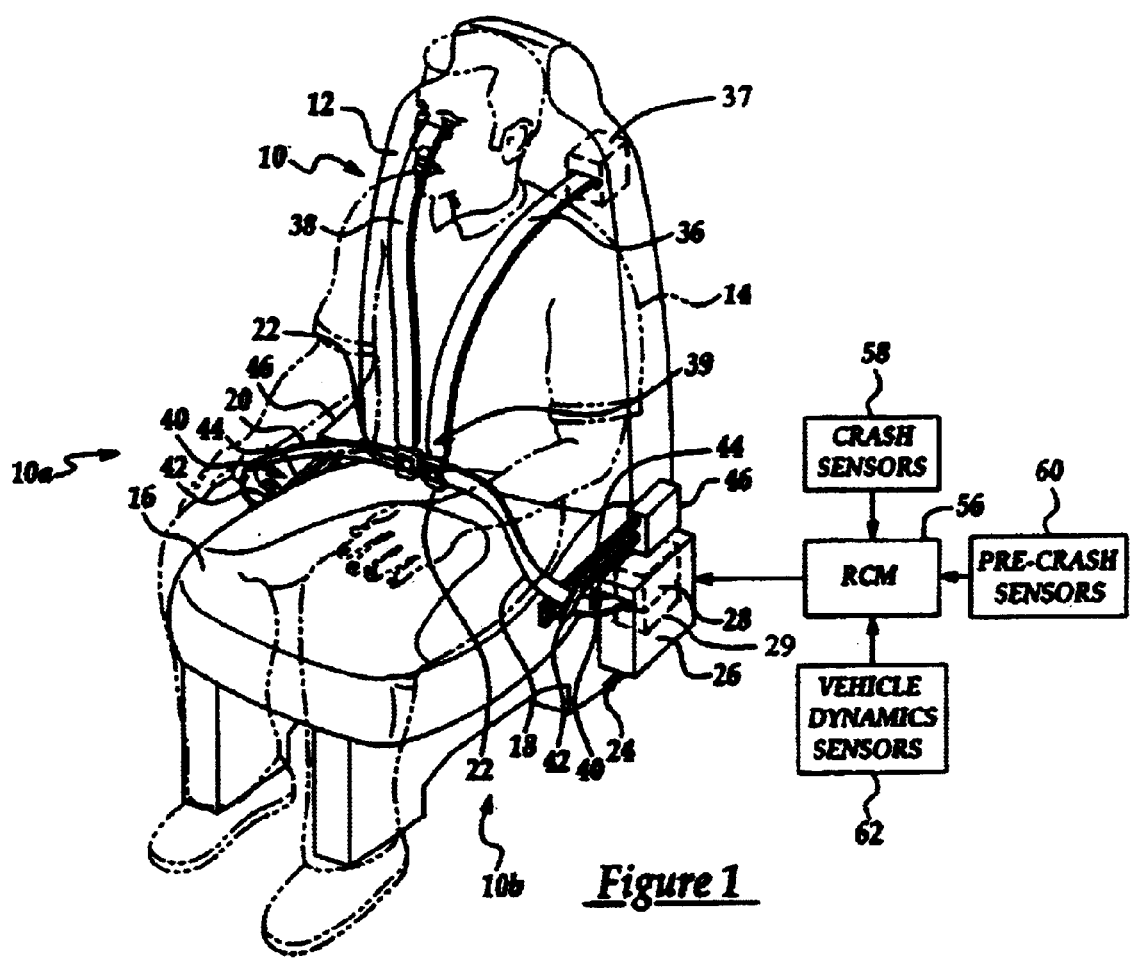
FIG. 1 is a perspective view of a vehicle seat equipped with a seat belt restraint system according to the present invention.
Figure 2:
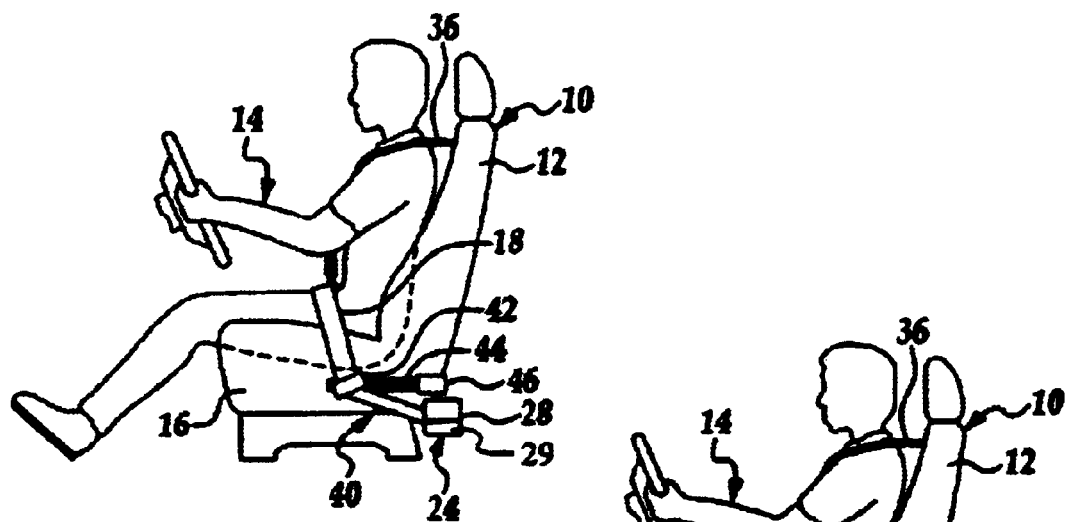
FIG. 2 is a side view of the invention restraint system in a comfort configuration.
Figure 3:
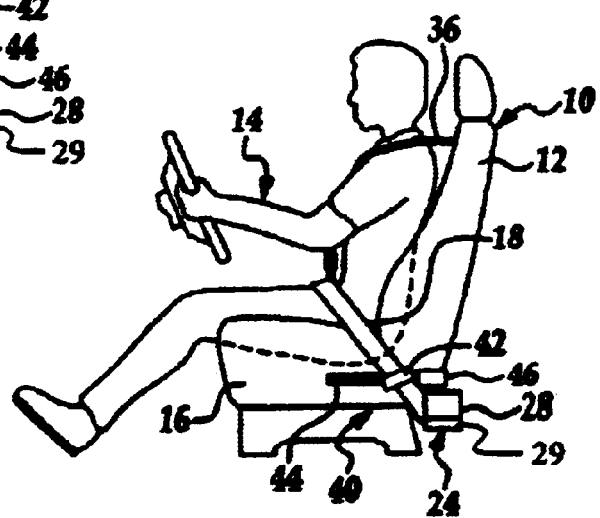
FIG. 3 is a side view of the invention restraint system in a crash restraint configuration.

A first embodiment of a seat belt restraint system according to the present invention is shown in FIGS. 1–3, wherein a seat 10 for use in an automotive vehicle (not shown) includes a generally upright seat back 12 for supporting the torso of a seated occupant 14 (indicated in phantom lines). The seat back 12 is shown as having an integrally formed headrest, but may alternatively have a separate, adjustable headrest. The seat 10 further includes a generally horizontal seat cushion 16 projecting forwardly from the bottom portion of the seat back 12 for supporting the pelvis and thighs of the seated occupant. For purposes of description only, the seat 10 will be referred to herein as having an inboard side 10a and an outboard side 10b, these terms referring to the sides of the seat adjacent to a center of a vehicle and an exterior side of a vehicle respectively, as is the case if the seat is located on the left side of the vehicle. This disclosure applies equally to a seat located at any position within a vehicle.

The seat belt restraint system further includes a lap belt comprising an outboard lap belt segment 18 and an inboard lap belt segment 20. The upper ends of the lap belt segments 18,20 are fitted with mating buckle/latch assemblies 22 that are releasably securable to one another in order to fasten the lap belt around the occupant's pelvis, as is well known in the restraints art. The opposite, lower end of the outboard lap belt segment 18 extends from a retraction point 24 adjacent the rear of the outboard side of the seat cushion 16. The retraction point 24 comprises a housing 26 (not shown in FIGS. 2 and 3) containing a belt retractor 28 which engages the outboard lap belt segment 18 and provides for adjustment of the length of the belt for varying-sized seated occupants and for properly positioning of the seat belt restraint system, as is well known in the art. The retractor 28 may also incorporate a belt pretensioner (shown schematically at 29) and/or a load limiter of the type well known in the restraints art. The inboard lap belt segment 20 extends from a retraction point adjacent the rear of the inboard side of the seat cushion 16. The inboard retraction point comprises a housing (not shown) and retractor (not shown) substantially similar to that on the outboard side. Alternatively, one or both of the lap belt retractors 28 may be located within or behind the seat 10, or may be secured to some vehicle structure adjacent the seat 10 which adequately supports seat belt loads, as is commonly known in the art. It is also possible to utilize a single retractor that engages both lap belt segments 18,20.

The seat belt restraint system further includes an outboard shoulder belt 36 and an inboard shoulder belt 38 extending downwardly from the upper portion of the seat back 12 adjacent to the outboard and inboard sides of the seat back respectively. The upper ends of the shoulder belt 36,38 are preferably engaged by belt retractors (shown schematically at 37) that may be located inside of or adjacent the seat back 12. Belt pretensioners and/or load limiters (not shown) of the type well known in the art may also be provided for the shoulder belts 36,38.

The lower ends of the shoulder belts 36,38 are releasably or permanently connected to the lap belt. In the preferred embodiment, the outboard and inboard shoulder belts 36,38 are secured to the buckle/latch assemblies 22 of the outboard and inboard lap belt segments 18,20 respectively. During normal use, the four point seat belt restraint system is unfastened by releasing the buckle/latch assemblies ,22 connecting the lap belt segments 18,20 to one another, while the shoulder belts 36,38 remain attached to the respective lap belt segments 18,20. All four belts are fastened to one another at what will be referred to herein as a center latching point 39, which is preferably positioned low on the occupant's pelvis.

A belt positioning mechanism 40 is provided adjacent the outboard side of the seat cushion 16 and comprises a guide member 42 which engages the outboard lap belt segment 18 between the belt retractor 28 and the center latching point 39, the belt segment 18 sliding freely through the guide member 42. The guide member 42 is shown in the form of a loop that completely surrounds the belt, but this is not a limitation of the invention, as many different configurations are possible. The guide member 42 is movable with respect to the seat 10 in a fore-and-aft direction, as will be further explained below, in order correctly position the lap belt with respect to the occupant 14.

In the depicted embodiment of the invention, the belt positioning mechanism 40 further comprises a track 44 disposed adjacent the side of the seat cushion 16. Track 44 may extend substantially horizontally in a forward-and-aft orientation as shown, or may be inclined. The guide member 42 slidingly engages the track 44 for movement therealong. An actuator mechanism 46 is preferably contained within housing 26 and moves the guide member 42 along the track 44. Actuator mechanism 46 may be powered by any appropriate means, such as an electric motor, a mechanical spring, a pyrotechnic charge, or compressed cold gas. If desired, the power sources for the actuator mechanism 46 may be integrated with the lap belt retractor 28 and/or its associated pretensioner 29. For example, a single pyrotechnic charge may be used to generate gas to power both the actuator mechanism 46 and the lap belt pretensioner 29.

A similar belt positioning mechanism 40 (see FIG. 1) is preferably provided on the inboard side of the seat cushion 16 to act on the inboard lap belt segment 20, and the present description applies equally to that mechanism.

FIGS. 1 and 2 depict the invention seat belt restraint system during normal vehicle operations, which consist of all operating conditions other than those that require optimum restraint of the vehicle occupants. This configuration is referred to herein as the comfort configuration. In the comfort configuration, the guide member 42 is positioned forward with respect to the track 44 and the seat cushion 16 such that engagement of the guide member 42 with lap belt segment 18 causes the portion of the belt extending downward over the outside of the occupant's thighs and/or pelvis (between the center latching point 39 and the belt guide member 42) to assume a nearly vertical orientation, as best viewed in FIG. 2. The lap belt retractor 28 preferably maintains a degree of tension in the lap belt segment 18, so that the nearly vertical orientation of this portion of the lap belt provides a downward pull on the shoulder belts 36,38. This helps to maintain the center latching point 39 in an optimum position low on the pelvis of the occupant.

Referring now to FIG. 3, in the event of an actual or anticipated collision or other abrupt deceleration of the vehicle, the restraint system moves to the crash restraint configuration, wherein the actuator mechanism 46 has moved the guide member 42 rearward along the track 44. When in the crash restraint position, the belt positioning mechanism 40 allows the lap belt segment 18 to extend in a generally straight line between the occupants thighs and the lap belt retractor 28. This rearward angle of the lap belt provides better restraint of the occupant during a rapid deceleration. The lap belt retractors 28, pretensioners 29 and/or shoulder belt retractors 37 are preferably also activated in order to more effectively restrain the occupant.

It is not necessary that the guide member 42 move in a straight line between the comfort position and the crash restraint position. Any type of actuator mechanism that moves the guide member 42 between a relatively forward position and a relatively rearward position is contemplated by the present invention. For example, the guide member may move through an arc centered at a point above or below the guide member.

While the guide track 44 and actuator mechanism 46 are shown attached to the side of the seat cushion 16 in the disclosed embodiment, one or more components of the belt positioning mechanism 40 may, if desired, be located partially or completely within the seat 10. Alternatively, the belt positioning mechanism 40 may be separate from and positioned adjacent the seat.

Figure 4:
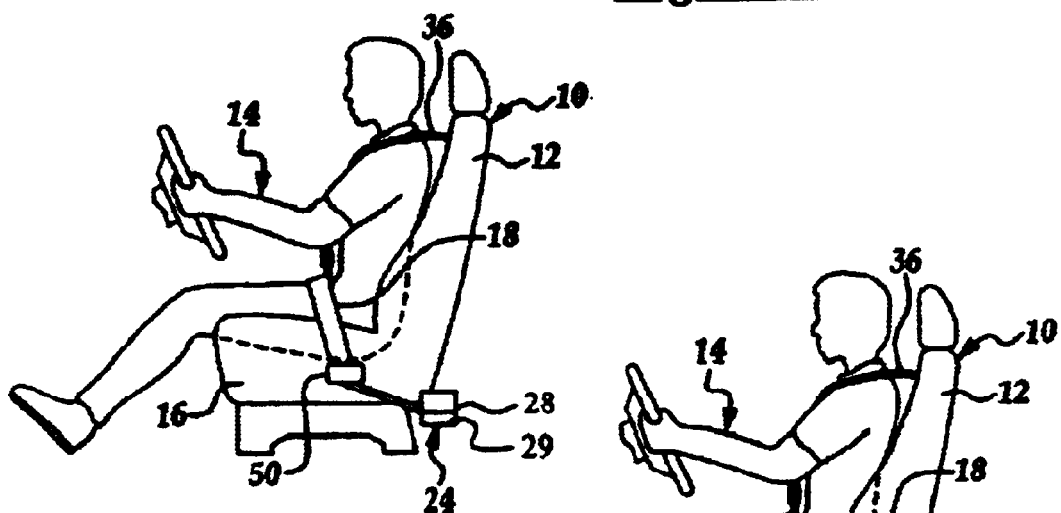
FIG. 4 is a side view of a second embodiment of the invention restraint system in a comfort configuration.
Figure 5:
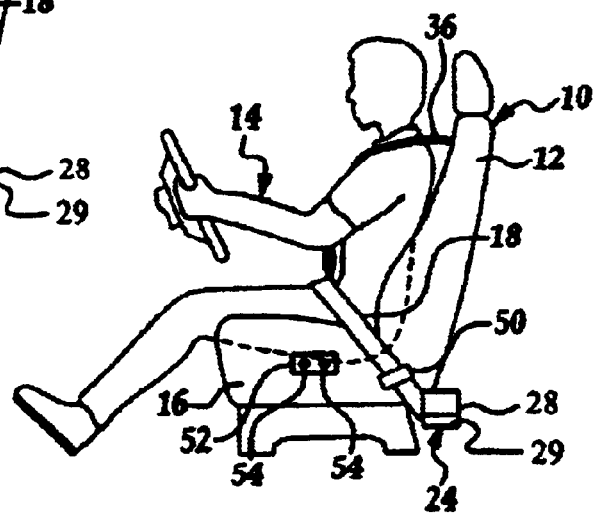
FIG. 5 is a side view of the second embodiment of the invention restraint system in a crash restraint configuration.

FIGS. 4 and 5 depict a second embodiment of the invention wherein a guide member 50 is fixed to the seat cushion 16 (or other structure adjacent to the seat 10) in the comfort position to hold the lap belt in the near-vertical orientation.

Upon sufficient vehicle deceleration the guide member 50 becomes detached from the seat cushion 16 and the lap belt pretensioner 29 associated with retractor 28 is activated to tighten the lap belt 18 and draw it to the crash restraint position shown in FIG. 5. The guide member 50 is completely detached from the seat 10 in the crash restraint position, and is supported only by its engagement with the lap belt 18.

The guide member 50 may be maintained in the comfort position by, for example, a release mechanism 52 disposed on or within the seat cushion 16 and having one or more pins 54 extending from. The pins 54 are retracted by any practical means to release the guide member 50, for example an electric motor, a pyrotechnic device, or a mechanical spring.

While the guide member 50 and release mechanism 52 are shown attached to the side of the seat cushion 16, the components may, if desired, be located partially or completely within the seat 10. Alternatively, they may be separate from and positioned adjacent the seat.

As indicated schematically in FIG. 1, operation of the belt positioning mechanism 40 is preferably controlled by a restraints control module (RCM) 56, a microprocessor device of a type well known in the art which preferably controls multiple components of the restraint systems in the vehicle, such as airbags, seat belt pretensioners, rollover curtains, etc. The RCM 56 receives information from a variety of sensors in order to make deployment and activation decisions for the various restraint systems. Sensors supplying information to the RCM 56 may include a crash sensor 58, a pre-crash sensor 60, and vehicle dynamic sensors 62. The crash sensor 58 may comprise, for example, an inertial sensor and/or a crush sensor. The pre-crash sensor 60 may comprise, for example, a radar device, a laser device, or an optical device. The vehicle dynamic sensors 62 may include, for example, an inertial measuring unit for sensing accelerations and/or rotations by one or more of the vehicle axis.

When the sensor inputs to the RCM 56 indicate that a crash has occurred or is imminent, the RCM 56 activates the belt positioning mechanism 40 to move the guide member 42 to the crash restraint position. The RCM 56 preferably simultaneously actuates the belt pretensioners associated with the retractors for the lap and/or shoulder belts.

Another advantage of the present invention is that the guide members 42,50 when in the comfort position serve as buckle presenters that make it more comfortable and convenient for the occupant to don the restraint system. When the buckle/latch assemblies 22 connecting the outboard and inboard lap belt segments 18,20 are unfastened from one another, the lap belt retractors 28,34 draw the belt segments 18,20 outward and downward until the guide members stop the buckle/latch assemblies 22. This positions the buckle/latch assemblies 22 in a relatively forward, easy-to-reach location, so that the occupant may easily grasp them in order to fasten the restraint system.

While the best modes for carrying out the invention have been described in detail, those familiar with the art to which this invention relates will recognize various alternative designs and embodiments for practicing the invention as defined by the appended claims.

What is claimed is:

1. A vehicle occupant restraint system comprising:
    a seat having a seat cushion, a first side, and a second side;
    a lap belt extending between a first point adjacent the first side of the seat and a second point adjacent the second side of the seat, the lap belt passing above the seat cushion between the first and second points;
    at least one belt guide disposed adjacent the first side of the seat and engaging the lap belt, the belt guide having a first position relative to the seat wherein it holds the lap belt in a comfort configuration, and the belt guide movable to a second position relatively rearward with respect to the first position wherein it holds the lap belt in a crash restraint configuration; and
    a restraints control module operative to receive inputs from at least one of a pre-crash sensor and a crash sensor and to command the belt guide to move from the first position to the second position in response to said inputs.

2. The vehicle occupant restraint system according to claim 1 further comprising a track disposed adjacent the first side of the seat, the belt guide slidingly engaged with the track and movable therealong between the first and second positions.

3. The vehicle occupant restraint system according to claim 1 further comprising an actuator for moving the belt guide between the first and second positions.

4. The vehicle occupant restraint system according to claim 3 wherein the actuator is powered by a pyrotechnic device.

5. The vehicle occupant restraint system according to claim 3 wherein the actuator is powered by compressed gas.

6. The vehicle occupant restraint system according to claim 3 wherein the actuator is powered by a mechanical spring.

7. The vehicle occupant restraint system according to claim 3 wherein the actuator is electrically powered.

8. The vehicle occupant restraint system according to claim 1 wherein the belt guide is attached to the seat when in the first position and is detached from the seat to allow movement to the second position.

9. The vehicle occupant restraint system according to claim 1 further comprising a belt pretensioner disposed adjacent the seat and engaging at least one end of the lap belt, the pretensioner operative to tighten the lap belt around an occupant of the seat.

10. The vehicle occupant restraint system according to claim 1 further comprising at least one shoulder belt.

11. The vehicle occupant restraint system according to claim 1 wherein the lap belt when in the crash restraint configuration extends generally directly between a hip of an occupant of the seat and the first point, and when in the comfort configuration extends generally vertically.

12. The vehicle occupant restraint system according to claim 1 wherein the lap belt comprises a first segment extending from a first retraction point adjacent the first side of the seat cushion and a second lap belt segment extending from a second retraction point adjacent the second side of the seat cushion, the first and second segments detachably connectable with one another at a center latching point above the seat cushion, and each of the first and second segments having a belt guide movable between the first position and the second position.

13. A vehicle occupant restraint system comprising:
   a seat having a seat cushion, a first side, and a second side;
   a first lap belt segment extending from a first retraction point adjacent the first side of the seat;
   a second lap belt segment extending from a second retraction point adjacent the second side of the seat and detachably connectable with the first lap belt segment at a center latching point above the seat cushion in order to be fastened around a seat occupant;
   first and second belt guides disposed adjacent the first and second sides of the seat respectively and engaging the first and second lap belt segments respectively, each of the first and second belt guides having a first position forward of the respective first and second retraction point wherein the first and second belt guides engage the respective first and second lap belt segment and causes the lap belt segment to assume a comfort configuration wherein the lap belt segment are relatively vertical as they extends toward the center latching point from the respective first and second belt guide, and each belt guide movable to a second position rearward from the first position and allowing the respective first and second lap belt segments to assume a crash restraint configuration wherein the lap belt segments extend in an upward and forward orientation toward the center latching point from the belt guides; and
   a restraints control module operative to receive inputs from at least one of a pre-crash sensor and a crash sensor and to command the belt guides to move from the first positions to the second position in response to said inputs.

14. The vehicle occupant restraint system according to claim 13 further comprising at least one belt pretensioner operative with at least one of the first and the second lap belt segments.

15. The vehicle occupant restraint system according to claim 13 further comprising at least one shoulder belt.

16. A method of restraining an occupant in a seat of a motor vehicle having a seat and a lap belt having a first end fixed adjacent a first side of the seat and a second point fixed adjacent a second side of the seat, the method comprising the steps of:
   providing at least one belt guide disposed adjacent the first side of the seat and engaging the lap belt, the belt guide having a first position relative to the seat wherein it holds the lap belt in a comfort configuration and a second position relatively rearward with respect to the first position wherein it holds the lap belt in a crash restraint configuration; and
   moving the belt guide from the first position to the second position in response to inputs from at least one of a pre-crash sensor and a crash sensor.

17. The method according to claim 16 wherein the step of moving the belt guide comprises sliding the belt guide along a track disposed adjacent the first side of the seat.

18. The method according to claim 16 wherein the step of moving the belt guide comprises detaching the belt guide from the seat.

* * * * *